United States Patent [19]

Rinaldo

[11] 3,732,758

[45] May 15, 1973

[54] PIPE CUTTING APPARATUS

[76] Inventor: Michael S. Rinaldo, 1921 Sequoya Drive, Youngstown, Ohio 44514

[22] Filed: Mar. 8, 1971

[21] Appl. No.: 121,885

[52] U.S. Cl..............................82/4 C, 90/14, 30/97
[51] Int. Cl. ...............................................B23b 5/16
[58] Field of Search....................30/95, 97, 101, 102; 82/46, 72, 73, 70.2, 4 C, 36 A; 90/12, 14; 74/824

[56] References Cited

UNITED STATES PATENTS 3,431,646  3/1969  Young.....................................30/97

Primary Examiner—Francis S. Husar
Attorney—Webster B. Harpman

[57] ABSTRACT

Pipe cutting apparatus for use in a continuous pipe mill for squaring and/or chamfering the ends of pieces of pipe cut in the mill incorporates a rotatable cutting tool and means for advancing it into engagement with the trailing end and/or leading end of pieces of pipe to be squared and/or chamfered. The apparatus imparts rotation to the cutting tool simultaneously with motion advancing the cutting tool into engagement with the pipe ends.

5 Claims, 2 Drawing Figures

INVENTOR.
MICHAEL S. RINALDO
BY
W. B. Harpman
ATTORNEY

PIPE CUTTING APPARATUS

BACKGROUND OF THE INVENTION

1. Field of the Invention

This invention relates to devices for squaring and/or chamfering the cut ends of pipe.

2. Description of the Prior Art

Prior apparatus of this type has been limited to devices for moving a cutting tool toward and away from the end of a pipe such as, for example, that disclosed in U.S. Pat. No. 2,889,721 and U.S. Pat. No. 1,904,950. Still other apparatus positions a mandrel in the end of the pipe and forms a center for a rotatably mounted cutting tool as seen in U.S. Pat. No. 3,115,054.

This invention rotates the cutting tool and progressively moves it into engagement with the end of the pipe to be squared and/or chamfered while the tooling itself revolves about the pipe or the pipe revolves relative to the tooling.

SUMMARY OF THE INVENTION

Pipe cutting apparatus comprises a cutting tool holder rotatably and axially movable in a device that is mounted for rotation about pieces of pipe, the ends of which are to be squared as by cutting and/or chamfering.

The tool holder is rotatably mounted in a pair of support arms which are, in turn, arranged for axial movement on a main support shaft and so that the support arms move relative to one another to cause rotation and advancement of the tool holder and the tools carried thereby. The apparatus may be revolved about pieces of pipe to be cut or may be positioned and the pipe revolved relative thereto. One of the support arms engages the exterior of the pipe and thereby controls the final cutting position of the tools in the tool holder.

DESCRIPTION OF THE PREFERRED EMBODIMENT

Figures 1, 2:
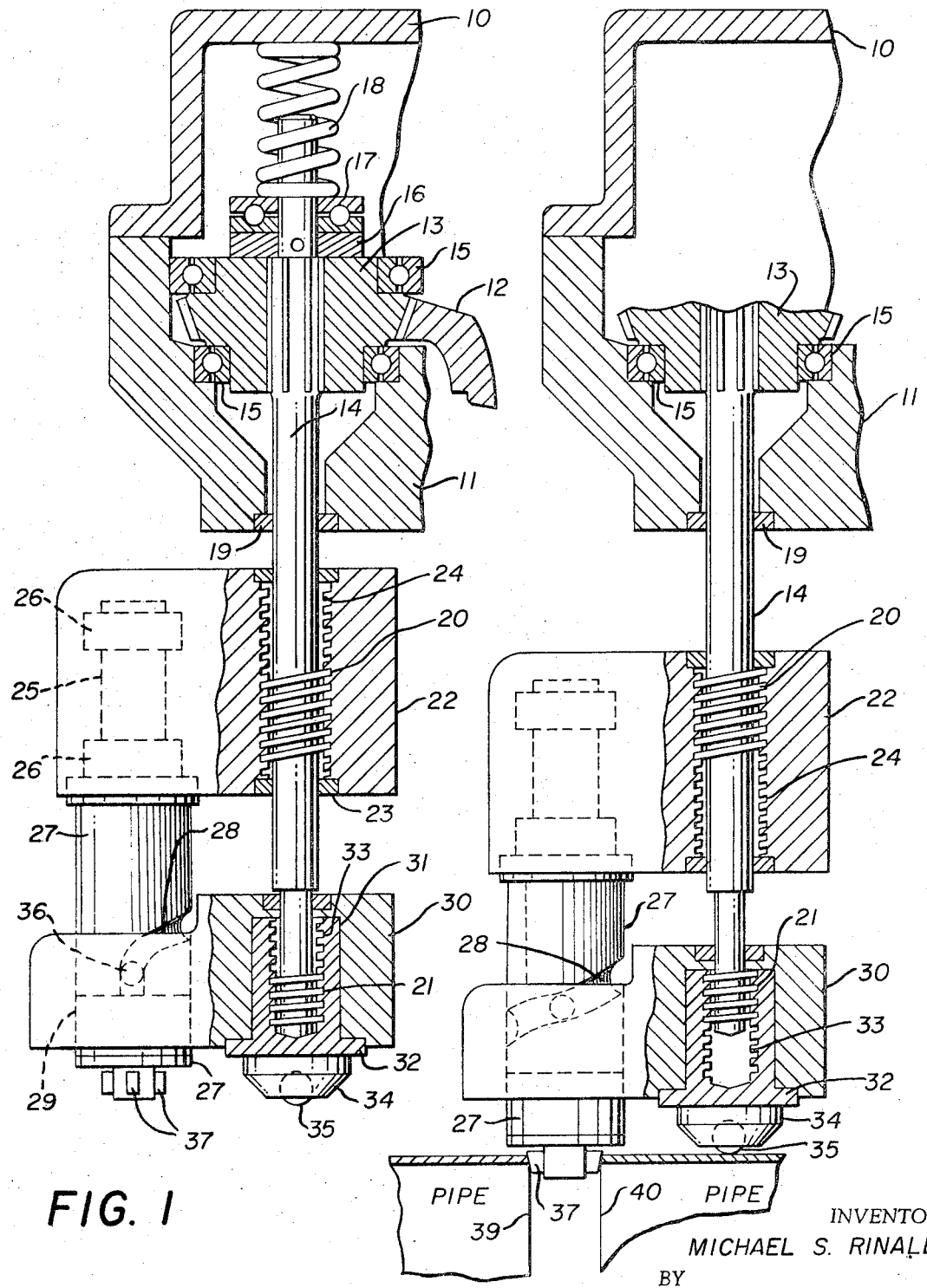
FIG. 1 is a side elevation view with parts broken away and parts in cross section of the pipe cutting apparatus embodying the present invention.
FIG. 2 is a side elevation view similar to FIG. 1 and showing the tooling engaging the trailing and leading ends of two pieces of pipe.

In the form chosen for illustration the pipe cutting apparatus of this invention is comprised of a two part mounting, the parts of which are indicated by the numerals 10 and 11 and which two part mounting is carried on the structure not shown which supports the pipe cutting apparatus adjacent to the path of pipe to be cut.

The structure which carries the pipe cutting apparatus of the present invention is usually part of the actual cut off means on a continuous pipe mill as will be understood by those skilled in the art and includes a revolvable gear 12 from which motion is originated in the pipe cutting apparatus of the disclosure.

In the drawings a gear 13 is splined to a main support shaft 14 and the gear 13 is journaled in the two part mounting 11 by suitable anti-friction bearings 15. The main support shaft 14 extends above the gear 13 through a collar 16 and a secondary bearing 17 and a tensioning spring 18 is positioned between the secondary bearing 17 and the portion 10 of the two part mounting heretofore referred to.

The main support shaft 14 extends downwardly through a bushing 19 in the lower portion 11 of the two part mounting and it will thus be seen that the main support shaft 14 is mounted for turning motion on its axis and axial motion which is opposed by the tensioning spring 18.

The depending portion of the main support shaft 14 has two thread patterns formed externally thereon. The first of these is indicated by the numeral 20 and comprises a relatively fast thread pattern, the second is indicated by the numeral 21 and comprises a relatively slow thread pattern.

A first support arm 22 has a vertical bore 23 therethrough and an internal thread pattern 24 which matches the relatively fast thread pattern 20 on the main support shaft 14.

It will thus be seen that rotary motion imparted the main support shaft 14 will cause the first support arm 22 to move longitudinally of the support shaft 14. The first support arm 22 has a cavity 25 formed inwardly and upwardly therein from its lower surface in which bearings 26 rotatably support one end of a tool holder 27, the major portion of which depends below the first support arm 22. The tool holder 27 has one or more spiral guides 28 formed in its exterior surface which is cylindrical and which extends downwardly through a bore 29 in a second support arm 30.

The second support arm 30 has a secondary bore 31 formed therein and a bushing 32 positioned in the bore 31 is internally threaded in a relatively slow thread pattern 33 which matches and engages the relatively slow thread pattern 21 on the main support shaft 14. The lower end of the bushing 32 is provided with a tapered end 34 which cages a bearing 35 which is adapted to be engaged against the exterior of a piece of pipe, the end of which is to be cut as may be seen by referring to FIG. 2 of the drawings.

The secondary support arm 30 has one or more movable members 36 positioned so as to extend into the bore 29 therein and engage the spiral guide or guides 28 formed in the tool holder 27 and hereinbefore referred to. The lower end of the tool holder 27 extends below the lower surface of the secondary support arm 30 and is arranged to carry replaceable cutting tools 37 as will be understood by those skilled in the art.

By referring now to FIG. 2 of the drawings it will be seen that portions of two pieces of pipe have been disclosed. The piece to the left shows a trailing end 39 and the piece to the right showing a leading end 40. Both pieces of pipe are movable from right to left relative to the pipe cutting apparatus of this invention and it will be observed that the pipe as from a continuous pipe mill has been previously roughly cut to form the trailing end 39 of the one piece and the leading end 40 on the following piece.

When these cut ends move into the position illustrated in FIG. 2 of the drawings, sensing devices, not shown, stop the forward motion of the pipe pieces and impart rotary motion to the gear 12 which, in turn, rotates the main support shaft 14 as hereinbefore described. The rotation of the main support shaft 14 causes downward motion of the first and second support arms 22 and 30 respectively at different rates of travel. The first support arm 22 moves downwardly relatively fast thereby bringing the tool holder 27 and the cutting tools 37 into engagement with the ends of the pieces of pipe to be squared and/or chamfered while the entire pipe cutting apparatus is being revolved about the pieces of pipe as hereinbefore described. Simultaneously the second support arm 30 moves downwardly more slowly with its members 36 following the spiral guides 28 and thereby causing partial rotation of the tool holder 27 and the tools 37 therein, thus, rotating the tools while the cutting action continues. This continues until the bearing 35 reaches the exterior of the pipe and stops the downward travel. The motion of the gear 12 is then stopped and reversed to withdraw the cutting tool.

The pipe cutting apparatus revolves about the pipes in a manner known in the art so that the ends 39 and 40 of the two pieces of pipe are cut square and/or chamfered if desired.

It will occur to those skilled in the art that the apparatus of the present invention is equally workable if it is positioned adjacent the pipe travel path and the pipes are rotated there beneath as is occasioned in some continuous pipe mills in connection with the cut off mechanism thereof. In either type of mill the pipe cutting apparatus disclosed herein automatically moves the pipe cutting tool into proper position against either the trailing end or the leading end of a piece of pipe or both as hereinbefore described and simultaneously rotates the cutting tools so that rotation of the pipe cutting apparatus about the pipe or rotation of the pipe relative to the cutting apparatus results in a very desirable and rapid squaring and/or chamfering of the ends of the pipe engaged by the cutting tools.

Although but one embodiment of the present invention has been illustrated and described, it will be apparent to those skilled in the art that various changes and modifications may be made therein without departing from the spirit of the invention.

Having thus described my invention, what I claim is:

1. Pipe cutting apparatus for squaring and chamfering the ends of cut pieces of pipe and including a main support shaft, support means therefor and means for imparting rotation to said support shaft, a pair of support arms positioned on said support shaft and arranged for movement longitudinally thereof and relative to one another, a tool holder rotatively engaged at one end in one of said support arms and extending through a bore in the other support arm and tools carried on the free end of said tool holder and means on said other support arm for engaging the exterior surface of a piece of pipe so as to limit the motion of said other support arm relative thereto while said first mentioned support arm and tool holder continues to move said cutting tools so as to engage the ends of said pieces of pipe to be squared and chamfered thereby.

2. The pipe cutting apparatus set forth in claim 1 and wherein said main support shaft is positioned in said apparatus for longitudinal movement and tension means is provided to restrain the same.

3. The pipe cutting apparatus set forth in claim 1 and wherein different thread patterns on said main support shaft engage matching thread patterns in said support arms and impart different rates of travel thereto.

4. The pipe cutting apparatus set forth in claim 1 and wherein an element including a gear is splined on said support shaft and journaled in said support means and arranged to receive rotary motion.

5. The pipe cutting apparatus set forth in claim 1 and wherein a spiral groove is formed in said tool holder and a guide member is positioned in said bore in said other support arm in engagement with said spiral groove.

* * * * *